United States Patent [19]

Rivers et al.

[11] 3,852,410
[45] Dec. 3, 1974

[54] SULFUR DIOXIDE AND PARTICULATE CONTAMINANT REMOVAL FROM INDUSTRIAL STACK GASES

[75] Inventors: Richard D. Rivers; Mohiuddin Pasha; Jesse M. Goldsmith; Robert T. Pring, both of Louisville, all of Ky.

[73] Assignee: American Air Filter Company, Inc., Louisville, Ky.

[22] Filed: Dec. 7, 1972

[21] Appl. No.: 311,735

[52] U.S. Cl. ................... 423/244, 55/73, 55/228, 55/524, 423/215.5
[51] Int. Cl. .......... B01j 9/04, B01j 9/08, B01j 9/12, B01j 9/16, B01j 9/20, C01b 17/00
[58] Field of Search ........................... 423/242–244, 423/215.5; 55/73, 228, 524

[56] References Cited
UNITED STATES PATENTS

| | | |
|---|---|---|
| 1,132,679 | 3/1915 | Murray et al. ...................... 423/242 |
| 1,271,899 | 7/1918 | Howard et al. ..................... 423/512 |
| 3,542,511 | 11/1970 | Shah .................................. 423/242 |
| 3,696,629 | 10/1972 | Heston ............................... 423/242 |

Primary Examiner—Oscar R. Vertiz
Assistant Examiner—Gregory A. Heller

[57] ABSTRACT

Sulfur dioxide and particulate contaminants are removed from industrial waste gases by a method which provides for a highly active sulfur dioxide reactant to be utilized and regenerated. The method further includes discharging stable, insoluble sulfur containing compounds thus eliminating possible reintroduction of sulfur into the environment and regeneration of the sulfur dioxide reactant by using carbon dioxide contained in the stack gas stream.

10 Claims, 1 Drawing Figure

SULFUR DIOXIDE AND PARTICULATE CONTAMINANT REMOVAL FROM INDUSTRIAL STACK GASES

BACKGROUND OF THE INVENTION

The present invention relates to a method of continuously removing sulfur dioxide, and particulate contaminants from industrial stack gases containing the same by use of a highly reactive sulfur dioxide reactant which is subsequently regenerated and reused.

In one conventional sulfur dioxide removing system, sulfur dioxide containing gases are passed through an absorbent porous carbonaceous mass of particulate material whereby sulfur dioxide is first absorbed on the material, which is generally carbon, coke or the like. The absorbed sulfur dioxide is then oxidized to sulfur trioxide by reaction with free oxygen contained in the waste gas or produced separately. Since the waste gases generally also contain at least some particulate matter and some carbon dioxide, as well as steam, there are competing reactions occurring during the sulfur dioxide removal which interfere adversely therewith.

It has also been proposed to first catalytically oxidize sulfur dioxide to sulfur trioxide thereby forming sulfuric acid in industrial waste gases and thereafter bind the formed sulfuric acid to a carbonaceous material. Subsequent heating of the absorbent carbonaceous material would release the bound sulfuric acid and promote its reduction again to sulfur dioxide on its expulsion from said material, with the additional result that the absorbent material, such as activated carbon, is reactivated. However, in such a proposed system one is still faced with the problem of disposal of sulfur dioxide without polluting the environment. Still another method of removal of sulfur dioxide from a waste gas stream includes the mixing of the gas stream with an alkaline earth metal oxide. Preferably, calcium oxide, magnesium oxide or mixtures thereof, are employed at temperatures between about 250° and 1,000° Farenheit to produce alkaline earth metal sulfites and some alkaline earth metal sulfates. After the oxide has reacted with the sulfur dioxide to produce solid sulfites and sulfates the solids are typically separated from the gas and the treated gas is released to the atmosphere. The solid sulfites and sulfates are then heated to a temperature above their respective decomposition temperatures to produce sulfur dioxide and the corresponding metal oxides.

Each of the above techniques suffers from the defects that they do not provide for the easy disposal of the sulfur in a relatively harmless form, and are generally expensive to operate, energy consuming, and inefficient overall. However the process of this invention solves these prior art problems and provides for the compact and efficient removal of sulfur dioxide, and particulate matter from industrial, stack gases in a continuous manner with the sulfur dioxide reactant material being regenerated and recycled and with the sulfur being removed in the form of stable, insoluble sulfur compounds.

SUMMARY OF THE INVENTION

A method for removal of sulfur dioxide and particulate contaminants from industrial waste gases prior to their discharge into the atmosphere, said method utilizing sulfur dioxide reactants of suitable activity which are subsequently regenerated, said method further resulting in stable insoluble sulfur containing compounds to be discarded, said method comprising; depositing soluble, alkaline sodium compounds onto filter means; passing waste gases comprising sulfur dioxide, carbon dioxide and particulate contaminants through said filter means whereupon said particulate contaminants are restrained by said filter means and whereupon a portion of said sulfur dioxide reacts with said soluble alkaline sodium compounds to form soluble reaction products; periodically removing said soluble reaction products, unreacted soluble alkaline sodium compounds and particulate contaminants from said filter means; leaching said soluble reaction products and the unreacted portion of said soluble alkaline sodium compounds from said particulate contaminants into a leach liquor; treating said leach liquor with calcium hydroxide to precipitate stable calcium salts, having anions including elements selected from the group sulfur and carbon, to be discarded leaving dissolved sodium compounds in said leach liquor; reforming said soluble alkaline sodium compounds by reacting said dissolved sodium compounds with carbon dioxide; converting the reformed soluble alkaline sodium compounds to solids.

The present invention provides for the simultaneous and continuous removal of sulfur dioxide and particulate contaminants from industrial waste gases by use of a sulfur dioxide reactant material which can be subsequently regenerated for reuse. The process further provides for the disposal of sulfur in a form which is extremely stable and which form is saleable thereby offering the advantages of permanent removal of sulfur without the prospect of having the sulfur again reintroduced into the environment and at the same time providing a monetary return to offset a portion of the cost of such sulfur dioxide removal. The process of this invention is more efficient than processes of the prior art since a highly reactive sulfur dioxide reactant is used to remove sulfur dioxide from the waste gas stream which reactant is subsequently regenerated with the resultant sulfur containing compounds being extremely stable. The process also advantageously provides that the regeneration of the reactant can be accomplished using carbon dioxide from the waste gas stream. Also it should be noted that heat from the industrial waste gases can be efficiently used in the process to enhance the regeneration of the sulfur dioxide reactant and the formation of the stable sulfur compounds to be discarded.

DESCRIPTION OF THE DRAWING

The drawing is a schematic diagram of one advantageous embodiment of the process of this invention.

DESCRIPTION OF THE PREFERRED EMBODIMENT

Figure 1:
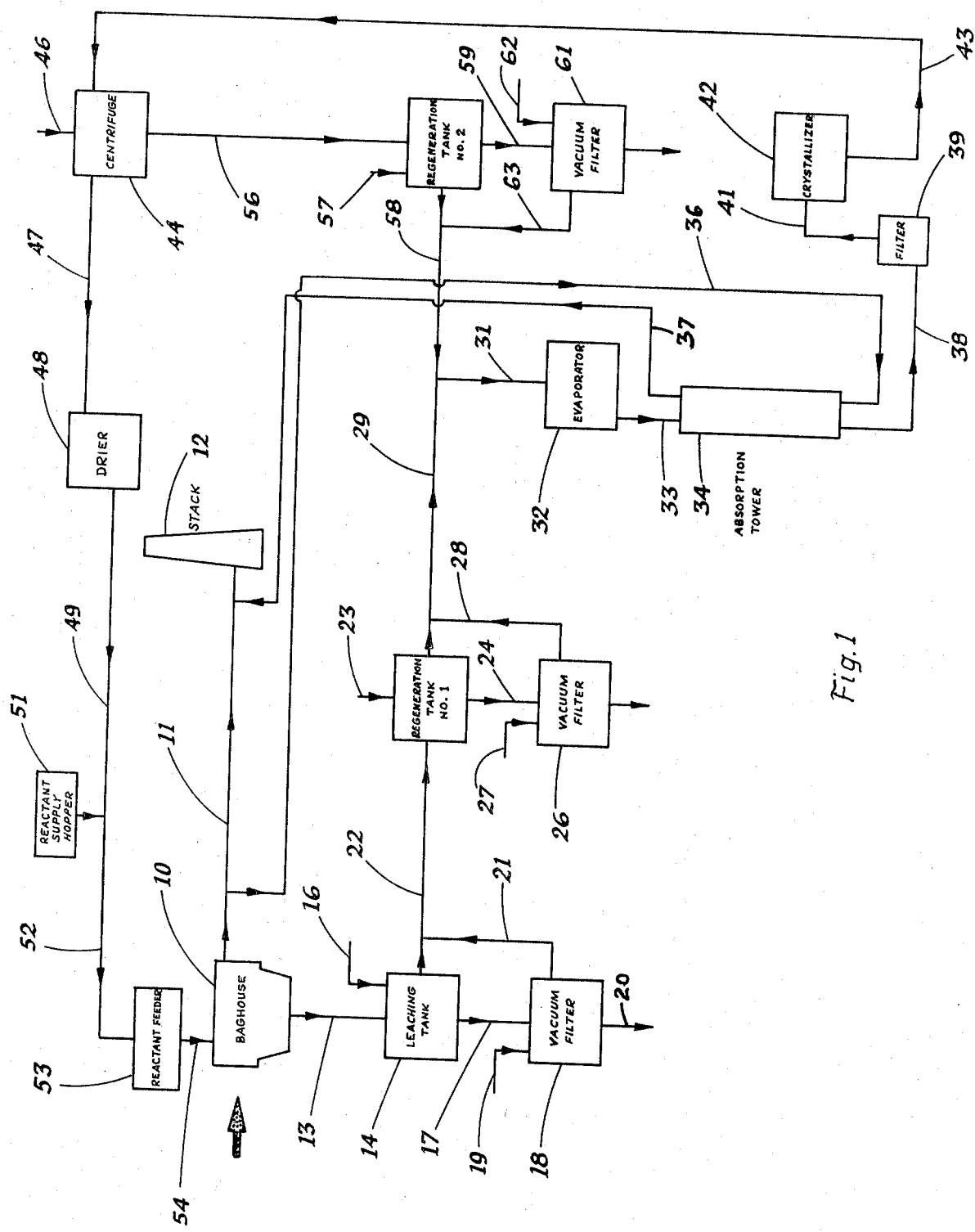

Industrial waste gas containing sulfur dioxide, carbon dioxide and particulate contaminants and having a water vapor content in the range of from between about 2 and 20 percent by volume enters bag house 10 having tube type fabric filter dust collecting surfaces therein which are preloaded with a finely divided alkaline sodium compound (soluble sulfur dioxide reactant material) selected from the group sodium carbonate, sodium bicarbonate, hydrated sodium carbonates, sodium sesquicarbonate, the naturally occurring ores, nahcolite and trona, containing said alkaline sodium compounds and combinations thereof, whereupon sulfur dioxide is chemically combined with the sulfur dioxide reactant to form soluble reaction products which, along with the particulate contaminants form a thin cake on the filter collecting surfaces. The waste gases proceed from the bag house to stack 12 where they are permitted to escape into the atmosphere after having had a portion of the carbon dioxide contained therein removed for chemical regeneration of the sulfur dioxide reactant material or having water removed therefrom or both. This regeneration will be discussed further hereinafter. The cake containing soluble reaction products, soluble sulfur dioxide reactant material, and particulate contaminants is removed from the fabric filter surfaces at preselected intervals by a suitable method such as shaking, vibrating, reverse air pulsing, etc., all of which are known in the art, the removed cake is then passed through line 13 to a leaching tank 14. Water is introduced into leaching tank 14 through line 16 to leach the reaction products and sulfur dioxide reactant from the particulate matter, thereby effecting separation thereof. The particulate matter is then passed through line 17 to vacuum filter 18 where it is essentially freed of water prior to disposal through line 20. It should be noted that a simple leaching tank 14 is shown; however, if conditions demand, a multi-stage counter-current process can be substituted therefor. Water is introduced into vacuum filter 18 through line 19 to thoroughly wash the inert particulates essentially free of any soluble reaction products and alkaline sodium compounds. The wash liquor resulting from this wash is then combined by virtue of line 21, with the leach liquor from leaching tank 14, and the combined liquid stream is passed through line 22 to regeneration tank no. 1. The leach liquor is treated with calcium hydroxide introduced through line 23, thereby precipitating calcium salts having anions selected from the group sulfur and carbon, which precipitates are passed through line 24 to vacuum filter 26 where they are essentially freed of water prior to disposal. Water is introduced into vacuum filter 26 through line 27 to insure removal of all soluble material from the precipitated calcium salts. There may be an intermediate thickening step introduced before this washing step if conditions so require. The resultant leach liquor is combined, by virtue of line 28, with the unreacted portion of the leach liquor of regeneration tank no. 1. The combination of liquors is then routed to evaporator 32 through lines 29 and 31. Evaporator 32 concentrates the leach liquor prior to its passing through line 33 into absorption tower 34. Absorption tower 34 provides for contacting the concentrated leach liquor with carbon dioxide containing gas which is introduced in countercurrent fashion by line 36 which is connected to line 11. Line 37 provides for the return of any unused portion of carbon dioxide containing gas to line 11. The leach liquor introduced into absorption tower 34 contains dissolved salts, principally sodium hydroxide, which, when contacted with carbon dioxide, immediately reacts to form reaction products of the group sodium carbonate, sodium bicarbonate, sodium sesquicarbonate, hydrated sodium carbonates, and combinations thereof, which are removed through line 38 to filter 39 and then through line 41 to crystalizer 42. The reaction products from absorption tower 34 now represent soluble reformed sodium compounds which are cooled, dried and comminuted to be made essentially identical to the compounds initially deposited upon the filtering surfaces of the fabric filters in bag house 10. These reformed compounds are passed through line 43 to centrifuge 44 where they are washed free of any liquor by water introduced through line 46 and then passed through line 47 to dryer 48 where they are essentially freed of water before being passed through line 49 to reactant supply hopper 51. It should be noted that it may be advantageous to convert the soluble reformed sodium compounds to the solid state by spray drying the solution containing these compounds, under controlled conditions to form hollow spheres. At preselected intervals the regenerated reactant is passed from reactant supply hopper 51 through line 52 into reactant feeder 53 and then through line 54 into bag house 10 to again be preloaded onto the tube type fabric filter dust collecting surfaces.

The process is further described in that the wash liquor from centrifuge 44 is passed through line 56 to regeneration tank no. 2. Regeneration tank no. 2 provides for the regeneration of any unregenerated sulfur dioxide reactant carried over from absorption tower 34 by the introduction of calcium hydroxide through line 57, with the liquor resulting therefrom being directed into the mainstream of the process through line 58 which in turn is connected to line 31 which feeds into evaporator no. 32 as previously noted. The solids from regeneration tank no. 2 are passed through line 59 into vacuum filter 61 for washing before disposal. Wash water is introduced into vacuum filter 61 through line 62 with the resultant wash liquor from vacuum filter 61 being routed through line 63 into line 58 for ultimate return to the evaporator and absorption tower. The solids separated by vacuum filter 61 are ultimately discarded. It should be further realized that in order to maintain equilibrium in the system, reactant supply hopper 51 is provided with a port for introduction of fresh sulfur dioxide reactant to replace, principally, the reactant material lost through vacuum filters 18 and 26 and vacuum filter 61.

Having thus described my invention what is claimed is:

1. A method for removal of sulfur dioxide and particulate contaminants from industrial waste gases prior to their discharge into the atmosphere, said method utilizing sulfur dioxide reactants of suitable activity which are subsequently regenerated, said method further resulting in stable insoluble sulfur containing compounds to be discarded, said method comprising:

depositing soluble, alkaline sodium compounds onto filtering surfaces of a fabric tube type dust collector said finely divided alkaline sodium compounds being selected from the group of sodium carbonate, sodium bicarbonate, hydrated sodium carbonates, sodium sesquicarbonate, the naturally ocurring ores, nahcolite and trona, containing said alkaline sodium compounds, and combinations thereof;

passing waste gases comprising sulfur dioxide, carbon dioxide and particulate contaminants through said dust collector whereupon said particulate contaminants are restrained by said dust collector and whereupon a portion of said sulfur dioxide reacts with said soluble alkaline sodium compounds to form soluble reaction products;

periodically removing said soluble reaction products, unreacted soluble alkaline sodium compounds and particulate contaminants from said dust collector;

leaching said soluble reaction products and the unreacted portion of said soluble alkaline sodium compounds from said particulate contaminants into a leach liquor;

treating said leach liquor with calcium hydroxide to precipitate stable calcium salts, having anions including elements selected from the group sulfur and carbon, to be discarded leaving dissolved sodium compounds in said leach liquor;

reforming said soluble alkaline sodium compounds by reacting said dissolved sodium compounds with carbon dioxide;

converting the reformed soluble alkaline sodium compounds to solids; and, redepositing said reformed soluble alkaline sodium compounds onto said filtering surfaces of said fabric-type dust collector for reaction with sulfur dioxide contained in waste gases.

2. The method of claim 1 wherein said reformed soluble alkaline sodium compounds are converted to solids by a process selected from the group: concentration, crystalization; evaporation, spray drying, solar evaporation; and combinations thereof.

3. The method of claim 1 wherein said treated leach liquor containing dissolved sodium compounds is concentrated before being contacted with carbon dioxide.

4. The method of claim 1 wherein said leaching of the soluble reaction products and the unreacted portion of said soluble alkaline sodium compounds includes washing said inert particulates essentially free of said soluble reaction products and said soluble alkaline sodium compounds.

5. The method of claim 1 wherein said precipitated stable calcium salts having anions including elements selected from the group sulfur and carbon to be discarded are separated from said leach liquor by thickening said leach liquor containing said calcium salts and filtering and washing said salts substantially free from sodium compounds.

6. The method of claim 1 wherein the step of converting the soluble sodium compounds to the solid state includes spray drying the solution containing said compounds under controlled conditions to form hollow spheres.

7. The method of claim 1 wherein said leaching of said reaction products and the unreacted portion of said alkaline sodium compounds from the inert particulate is accomplished by a multi-stage counter current leaching process.

8. The method of claim 1 wherein entrained water is removed from said waste gases subsequent to passing said gases through said filter means.

9. The method of claim 1 wherein the water vapor content of said waste gases passing through said filter means is in the range of from between about 2 and 20 percent by volume.

10. A method for removal of sulfur dioxide and particulate contaminants from industrial waste gases prior to their discharge into the atmosphere, said method utilizing sulfur dioxide reactants of suitable activity which are subsequently regenerated, said method further resulting in stable insoluble sulfur containing compounds to be discarded, said method comprising:

depositing soluble finely divided alkaline sodium compounds selected from the group: sodium carbonate, sodium bicarbonate, hydrated sodium carbonates, sodium sesquicarbonate, the naturally occuring ores, nahcolite and trona, containing said alkaline sodium compounds, and combinations thereof, on the filtering surfaces of a fabric tube type dust collector;

passing waste gases having a water vapor content in the range of between about 2 and about 20 percent by volume and comprising sulfur dioxide, carbon dioxide and particulate contaminants through the filtering surfaces of said tube type dust collector whereupon a major portion of said sulfur dioxide reacts with said soluble finely divided alkaline sodium compounds on said filtering surfaces to form soluble reaction products;

periodically removing said soluble reaction products, the unreacted portion of said soluble alkaline sodium compounds and said particulate contaminants from said filtering surfaces;

leaching said soluble reaction products and said unreacted portion of said soluble alkaline sodium compounds from said inert particulates with water to effect separation thereof;

treating the resultant leach water with calcium hydroxide to precipitate stable calcium salts, having anions including elements selected from the group: sulfur and carbon, to be discarded leaving dissolved sodium hydroxide in said leach water;

reforming said soluble alkaline sodium compounds by reacting said dissolved sodium hydroxide with carbon dioxide from said previously treated waste gases;

converting the reformed soluble alkaline sodium compounds to solids by a process selected from the group of concentration, crystallization, evaporation, spray drying, solar evaporation, and combinations thereof;

preparing said solid, soluble, alkaline sodium compounds for reuse by drying, cooling and comminuting and;

redepositing the resultant finely divided soluble alkaline sodium compounds onto said filtering surfaces of said fabric tube type dust collector thereby providing regenerated finely divided soluble alkaline sodium compounds for further reaction with sulfur dioxide in said waste gases.

* * * * *